United States Patent
Wilson et al.

(10) Patent No.: US 11,122,806 B2
(45) Date of Patent: Sep. 21, 2021

(54) ANTIMICROBIAL COATING FOR BUILDING PANEL

(71) Applicant: National Gypsum Properties, LLC, Charlotte, NC (US)

(72) Inventors: Thomas R. Wilson, Newmarket, NH (US); Joseph J. Bailey, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 0 days.

(21) Appl. No.: 16/656,828

(22) Filed: Oct. 18, 2019

(65) Prior Publication Data

US 2020/0120935 A1    Apr. 23, 2020

Related U.S. Application Data

(60) Provisional application No. 62/747,688, filed on Oct. 19, 2018.

(51) Int. Cl.
| | | |
|---|---|---|
| *E04B 2/02* | (2006.01) |
| *A01N 43/78* | (2006.01) |
| *A01N 43/54* | (2006.01) |
| *A01N 43/56* | (2006.01) |
| *C04B 28/14* | (2006.01) |
| *C04B 111/00* | (2006.01) |

(52) U.S. Cl.
CPC .............. *A01N 43/78* (2013.01); *A01N 43/54* (2013.01); *A01N 43/56* (2013.01); *C04B 28/14* (2013.01); *E04B 2/02* (2013.01); *C04B 2111/0062* (2013.01); *E04B 2002/0286* (2013.01)

(58) Field of Classification Search
CPC ........ A01N 43/78; A01N 43/54; A01N 43/58; A01N 25/03; C04B 28/14; C04B 2111/0062; C04B 41/009; C04B 41/63; C04B 26/28; C04B 41/48; C04B 26/04; C04B 26/285; C04B 26/06; C04B 26/02; E04B 2/02; E04B 2002/0286
USPC .......................................................... 52/517
See application file for complete search history.

(56) References Cited

U.S. PATENT DOCUMENTS

| | | | |
|---|---|---|---|
| 2,685,571 A | 8/1954 | Stinchfield et al. |
| 4,117,183 A | 9/1978 | Long |
| 4,372,814 A | 2/1983 | Johnstone et al. |
| 4,448,639 A | 5/1984 | Long |
| 4,470,877 A | 9/1984 | Johnstone et al. |
| 4,548,676 A | 10/1985 | Johnstone et al. |
| 4,853,085 A | 8/1989 | Johnstone et al. |
| 4,959,272 A | 9/1990 | Long |
| 5,945,198 A | 8/1999 | Deodhar et al. |
| 6,105,325 A | 8/2000 | Zuber et al. |
| 6,613,773 B2 | 9/2003 | Clough et al. |
| 6,663,979 B2 | 12/2003 | Deodhar et al. |
| 6,716,906 B1 | 4/2004 | Houman et al. |
| 6,737,156 B2 | 5/2004 | Koval et al. |
| 6,767,647 B2 | 7/2004 | Swofford et al. |
| 6,770,354 B2 * | 8/2004 | Randall .................. E04C 2/043 428/219 |
| 6,777,412 B2 | 8/2004 | Clough et al. |
| 6,808,793 B2 | 10/2004 | Randall et al. |
| 6,893,752 B2 | 5/2005 | Veeramasuneni et al. |
| 7,208,225 B2 | 4/2007 | Zuber et al. |
| 7,214,411 B2 | 5/2007 | Colbert et al. |
| 7,337,587 B2 | 3/2008 | Zuber et al. |
| 7,553,780 B2 | 6/2009 | Smith |
| 7,635,657 B2 | 12/2009 | Bland et al. |
| 7,745,357 B2 | 6/2010 | Smith et al. |
| 7,749,928 B2 | 7/2010 | Smith et al. |
| 7,807,592 B2 | 10/2010 | Bland et al. |
| 7,932,195 B2 | 4/2011 | Smith et al. |
| 7,989,370 B2 | 8/2011 | Currier et al. |
| 8,034,416 B2 * | 10/2011 | Dupre, Jr. ............... E04C 2/043 427/403 |
| 8,092,858 B2 | 1/2012 | Smith |
| 8,138,196 B2 | 3/2012 | Cornish et al. |
| 8,151,532 B2 | 4/2012 | Zuber et al. |
| 8,173,681 B2 | 5/2012 | Steiner et al. |
| 8,461,067 B2 | 6/2013 | Smith et al. |
| 8,524,373 B2 | 9/2013 | Hedman |
| 8,525,790 B2 * | 9/2013 | Kim ................... H04N 5/23203 345/166 |
| 8,535,790 B2 * | 9/2013 | Dupre, Jr. ........... B28B 19/0092 428/219 |
| 8,617,718 B2 | 12/2013 | Rohlf et al. |
| 8,808,720 B2 | 8/2014 | Mulqueen et al. |
| 8,835,546 B2 | 9/2014 | Li |
| 9,420,791 B2 | 8/2016 | Uhr |
| 9,464,007 B2 | 10/2016 | Cornish et al. |
| 9,738,796 B1 | 8/2017 | Bury et al. |
| 9,834,929 B2 | 12/2017 | Boydston et al. |
| 9,919,969 B2 | 3/2018 | Yeung et al. |
| 9,945,119 B2 | 4/2018 | Aldabaibeh et al. |

(Continued)

FOREIGN PATENT DOCUMENTS

| | | |
|---|---|---|
| AU | 1992019322 | 1/1993 |
| EP | 0521804 | 1/1993 |

(Continued)

*Primary Examiner* — Beth A Stephan
(74) *Attorney, Agent, or Firm* — Dority & Manning, P.A.

(57) ABSTRACT

In general, the present invention is directed to a building panel, such as a gypsum board, comprising a core having a first side and a second side opposing the first side and at least one facing material having a coating comprising at least one fungicide, at least one polymeric binder, and at least one pigment. The panel satisfies at least one of the following: the board exhibits a rating of 2 or less when tested in accordance to ASTM G21-15 or the board exhibits a rating of at least 8 when tested in accordance to ASTM D3273-16. The panel may also exhibit at least a Level 3 finish.

26 Claims, No Drawings

(56) References Cited

U.S. PATENT DOCUMENTS

| | | | |
|---|---|---|---|
| 9,945,190 B2* | 4/2018 | Crowley | E21B 17/20 |
| 2002/0164574 A1* | 11/2002 | Tanzer | C12Q 1/025 |
| | | | 435/4 |
| 2004/0154264 A1 | 8/2004 | Colbert | |
| 2007/0048342 A1 | 3/2007 | Hauber et al. | |
| 2007/0082170 A1 | 4/2007 | Colbert et al. | |
| 2008/0026026 A1 | 1/2008 | Lu et al. | |
| 2008/0075839 A1* | 3/2008 | Haubrich | H05K 3/048 |
| | | | 427/66 |
| 2008/0085953 A1* | 4/2008 | Bhattacharya | C09D 101/14 |
| | | | 524/37 |
| 2008/0134931 A1 | 6/2008 | Wachtler et al. | |
| 2009/0029141 A1 | 1/2009 | Shake et al. | |
| 2009/0030053 A1 | 1/2009 | Godwin et al. | |
| 2009/0084514 A1 | 4/2009 | Smith et al. | |
| 2009/0208546 A1 | 8/2009 | Shirley et al. | |
| 2009/0208714 A1 | 8/2009 | Currier et al. | |
| 2009/0221619 A1 | 9/2009 | Cornish et al. | |
| 2009/0263673 A1 | 10/2009 | Yeung et al. | |
| 2009/0269382 A1 | 10/2009 | Mulqueen et al. | |
| 2009/0297571 A1 | 12/2009 | Cornish et al. | |
| 2010/0047461 A1 | 2/2010 | Colbert | |
| 2010/0120878 A1 | 5/2010 | Broquet et al. | |
| 2010/0143682 A1 | 6/2010 | Shake et al. | |
| 2010/0221524 A1 | 9/2010 | Smith et al. | |
| 2011/0253291 A1 | 10/2011 | Allen et al. | |
| 2012/0308631 A1 | 12/2012 | Shirley et al. | |
| 2014/0206534 A1 | 7/2014 | Mulqueen et al. | |
| 2014/0261954 A1 | 9/2014 | Dubey et al. | |
| 2014/0272402 A1 | 9/2014 | Dubey et al. | |
| 2015/0030862 A1 | 1/2015 | Rohlf | |
| 2015/0064433 A1 | 3/2015 | Foster et al. | |
| 2015/0176211 A1 | 6/2015 | Knapp et al. | |
| 2015/0240492 A1 | 8/2015 | Teng et al. | |
| 2015/0360439 A1 | 12/2015 | Li et al. | |
| 2016/0052168 A1 | 2/2016 | Li | |
| 2016/0069070 A1 | 3/2016 | Li | |
| 2016/0185994 A1 | 6/2016 | Peet et al. | |
| 2016/0230013 A1 | 8/2016 | Englert et al. | |
| 2016/0264461 A1* | 9/2016 | Peng | B28B 23/0006 |
| 2016/0286796 A1 | 10/2016 | Lu et al. | |
| 2016/0347936 A1 | 12/2016 | Garces et al. | |
| 2017/0002564 A1 | 1/2017 | Peet et al. | |
| 2017/0197379 A1 | 7/2017 | Teng et al. | |
| 2017/0282510 A1 | 10/2017 | Peet et al. | |
| 2017/0284093 A1 | 10/2017 | Lai et al. | |
| 2018/0010338 A1 | 1/2018 | Boydston et al. | |
| 2018/0080226 A1 | 3/2018 | Lu et al. | |
| 2018/0080762 A1 | 3/2018 | Dubost et al. | |

FOREIGN PATENT DOCUMENTS

| | | |
|---|---|---|
| EP | 0777800 | 6/1997 |
| EP | 1130188 | 7/2003 |
| EP | 1076137 | 10/2007 |
| WO | WO1997002395 | 1/1997 |

* cited by examiner

ANTIMICROBIAL COATING FOR BUILDING PANEL

CROSS-REFERENCE TO RELATED APPLICATION

The present application claims filing benefit of U.S. Provisional Patent Application No. 62/747,688 having a filing date of Oct. 19, 2018, and which is incorporated herein by reference in its entirety.

BACKGROUND OF THE INVENTION

Generally, finishing for gypsum board is characterized by having a certain level of finishing. For better finishes, typically such finishing steps can be quite labor-intensive, for example to provide a smooth final wall appearance. In addition, in certain instances, it is desired to provide antimicrobial, such as mold and mildew, resistance to such gypsum boards. Typically, antimicrobial additives for providing such resistance are either included in the gypsum core or the matrix of the facing material when the facing material is manufactured.

As a result, there is a need to provide an improved coating, facing material, and corresponding gypsum board that provide antimicrobial resistance as well as an improved appearance that may not be as labor-intensive as traditional gypsum board.

SUMMARY OF THE INVENTION

In accordance with one embodiment of the present invention, a gypsum board is disclosed. The gypsum board comprises a gypsum core having a first side and a second side opposing the first side and at least one facing material having a coating comprising at least one fungicide, at least one polymeric binder, and at least one pigment. The board exhibits at least a Level 3 finish. The board satisfies at least one of the following: the board exhibits a rating of 2 or less when tested in accordance to ASTM G21-15 or the board exhibits a rating of at least 8 when tested in accordance to ASTM D3273-16.

In accordance with another embodiment of the present invention, a method of making a gypsum board is disclosed. The method comprises providing a first facing material, depositing a gypsum slurry onto the first facing material, providing a second facing material onto the gypsum slurry, and wherein at least one of the first facing material and the second facing material includes a coating comprising at least one fungicide, at least one polymeric binder, and at least one pigment. The board exhibits at least a Level 3 finish. The board satisfies at least one of the following: the board exhibits a rating of 2 or less when tested in accordance to ASTM G21-15 or the board exhibits a rating of at least 8 when tested in accordance to ASTM D3273-16.

In accordance with another embodiment of the present invention, a building panel is disclosed. The building panel comprises a cementitious core having a first side and a second side opposing the first side and at least one facing material having a coating comprising at least one fungicide, at least one polymeric binder, and at least one pigment. The panel satisfies at least one of the following: the panel exhibits a rating of 2 or less when tested in accordance to ASTM G21-15 or the panel exhibits a rating of at least 8 when tested in accordance to ASTM D3273-16.

DETAILED DESCRIPTION OF THE PREFERRED EMBODIMENTS

It is to be understood by one skilled in the art that the present disclosure is a description of exemplary embodiments only, and is not intended as limiting the broader aspects of the present subject matter, which broader aspects are embodied in the exemplary constructions.

Generally, the present disclosure is directed to an antimicrobial coating for a facing material, in particular a facing material for a building panel. The building panel may be a gypsum board or a cement board. The coating includes at least one fungicide, at least one polymeric binder, and at least one pigment. By employing a coating as disclosed herein, the present inventors have discovered various advantages.

For instance, the present inventors have discovered that a board containing a coating as disclosed herein can pass various antimicrobial tests. In particular, the panel, such as the gypsum board, containing the facing material as coated herein can pass ASTM G21-15 entitled "Standard Practice for Determining Resistance of Synthetic Polymeric Materials to Fungi," which is incorporated herein by reference in its entirety. Such test utilizes the following fungi in the test: *Aspergillus brasiliensis, Penicillium funiculosum, Chaetomium globosum, Trichoderma virens,* and *Aureobasidium pullulans*. According to this test, the panel, such as the gypsum board, may have a rating of 2 or less, such as a rating of 1 or less (less than 10% coverage—trace of growth), such as a rating of 0, which indicates no growth according to the standards of this test. Similarly, a coated facing material as disclosed herein would also pass ASTM G21-15 and exhibit a rating of 0. Furthermore, the coating formulation as disclosed herein could also be characterized as providing a rating of 0 according to ASTM G21-15 when applied to a facing material as disclosed herein. In addition to such test, the panel, such as the gypsum board, coated facing material, and/or coating formulation when applied to a facing material may also pass ASTM D3273-16. For instance, when tested according to ASTM D3273-16, the board may exhibit a rating of at least 8, such as at least 9, such as 10. Generally, ASTM D3273-16 is less stringent than ASTM G21-15. Furthermore, regardless of the specific test utilized, the growth as determined by either test may be 20% or less, such as 15% or less, such as 10% or less, such as 5% or less.

In addition to the aforementioned antimicrobial effectiveness, the present inventors have discovered that the facing material and board may exhibit a certain level finish. For instance, the board may exhibit at least a Level 3 finish, such as at least a Level 4 finish, such as at least a Level 5 finish. Such finishes, including a Level 5 finish, are defined by ASTM C840-17a entitled "Standard Specification for Application and Finishing of Gypsum Board," which is incorporated herein by reference in its entirety," in particular section 24.6.6.1. Such finishes, including a Level 5 finish, may also be defined by GA-214-2015 entitled "Recommended Levels of Finish for Gypsum Board, Glass Mat and Fiber-Reinforced Gypsum Panels," which is incorporated herein by reference in its entirety.

In addition to the above, the gypsum board as disclosed herein may also satisfy the standards according to ASTM C1396/C1396M-17 entitled "Standard Specification for Gypsum Board," which is incorporated herein by reference in its entirety. Furthermore, the coated facing material as disclosed herein may also be characterized as satisfying the standards of ASTM C1396/C1396M-17 when provided on a gypsum core for a gypsum board as disclosed herein. In addition, the coating formulation as disclosed herein may also be characterized as satisfying the standards of ASTM C1396/C1396M-17 when applied to a facing material and on a gypsum core for a gypsum board as disclosed herein.

The panel, such as the gypsum board, as disclosed herein may also exhibit improved abrasion. For instance, the panel, such as the gypsum board, may exhibit a rating of at least 2, such as at least 3 when tested according to ASTM C1629/C1629M-15 entitled "Standard Classification for Abuse-Resistance Nondecorated Interior Gypsum Panel Products and Fiber-Reinforced Cement Panels," which is incorporated herein by reference in its entirety. Furthermore, the coated facing material as disclosed herein may also be characterized as satisfying the aforementioned ratings of ASTM C1629/C1629M-15 when provided on a gypsum core for a gypsum board as disclosed herein. In addition, the coating formulation as disclosed herein may also be characterized as satisfying the aforementioned ratings of ASTM C1629/C1629M-15 when applied to a facing material and on a core of a panel, such as a gypsum core for a gypsum board, as disclosed herein. For instance, the board may have a maximum surface abrasion resistance of 1.5 mm, such as 1.25 mm, such as 1 mm, such as 0.75 mm, such as 0.5 mm, such as 0.4 mm, such as 0.3 mm. The board may have a maximum indentation of 2.5 mm, such as 2 mm, such as 1.5 mm, such as 1.3 mm. The board may have a minimum soft body impact value of of 265 J, such as 300 J, such as 325 J, such as 350 J, such as 375 J, such as 400 J, such as 408 J. The board may have a minimum hard body impact value of 136 J, such as 150 J, such as 175 J, such as 200 J, such as 204 J.

Furthermore, the panel, such as the gypsum board, as disclosed herein may also exhibit a recommended flame spread or smoke developed rating. For instance, such rating may be 0 according to ASTM E84-16 entitled "Standard Test Method for Surface Burning Characteristics of Building Materials," which is incorporated herein by reference in its entirety. Furthermore, the coated facing material as disclosed herein may also be characterized as satisfying the aforementioned ratings of ASTM E84-16 when provided on a core of a panel, such as a gypsum core for a gypsum board, as disclosed herein. In addition, the coating formulation as disclosed herein may also be characterized as satisfying the aforementioned ratings of ASTM E84-16 when applied to a facing material and on a core of a panel, such as a gypsum core for a gypsum board, as disclosed herein. In addition, the panel, such as the gypsum board, may satisfy and pass a fire test as performed in accordance to ASTM E119.

Fungicide

As indicated above, the coating and coating formulation disclosed herein include at least one fungicide. The coating and coating formulation, however, may include more than one fungicide. For instance, in one embodiment, the coating and coating formulation may include at least two fungicides, such as at least three fungicides The fungicide may include various fungicides as generally known. For instance, the fungicide may include an azole. The fungicide may include a strobilurin. The fungicide may include fludioxonil. Also, the fungicide may include an isothiazolinone. Further, the fungicide may include a pyrithione. In one embodiment, the fungicide may include an azole, a strobilurin, fludioxonil, an isothiazolinone, a pyrithione, or a mixture thereof. In another embodiment, the fungicide may include an azole, a strobilurin, fludioxonil, or a mixture thereof.

As indicated above, in one embodiment, the fungicide includes an azole. The azole may include any azole as generally known in the art. For instance, the azole may include thiabendazole, ketoconazole, fluconazole, itraconazole, voriconazole, posaconazole, ravuconazole, tebuconazole, fluconazole.bromuconazole, epoxiconazole, cyproconazole, flusilazole, metconazole, hexaconazole, difenoconazole, propiconazole, or a mixture thereof. In one embodiment, the fungicide may include thiabendazole, ketoconazole, fluconazole, metconazole, difenoconazole, propiconazole, or a mixture thereof. In one particular embodiment, the fungicide includes thiabendazole.

As indicated above, in one embodiment, the fungicide includes a strobilurin. The strobilurin may include any strobilurin as generally known in the art. For instance, the strobilurin may include azoxystrobin, kresoxim-methyl, picoxystrobin, fluoxastrobin, oryzastrobin, dimoxystrobin, pyraclostrobin, trifloxystrobin, or a mixture thereof. In one embodiment, the strobilurin includes azoxystrobin, azoxystrobin, trifloxystrobin, or a mixture thereof. In one particular embodiment, the strobilurin includes azoxystrobin.

As indicated above, in one embodiment, the fungicide includes fludioxonil.

As indicated above, the fungicide may include at least one fungicide, such as at least two fungicides. In this regard, the fungicide may include an azole and a strobilurin. For instance, the fungicide may include thiabendazole and azoxystrobin. In one particular embodiment, the fungicide may include at least three fungicides. In this regard, the fungicides may include an azole, a strobilurin, and fludioxonil. For instance, the fungicides may include thiabendazole, azoxystrobin, and fludioxonil.

As indicated above, in one embodiment, the fungicide may include an isothiazolinone. The isothiazolinone may include any isothiazolinone as generally known in the art. For instance, the isothiazolinone may include benzisothiazolinone, butylbenzisothiazolinone, octylisothiazolinone, dichlorooctylisothiazolinone, methylisothiazolinone, chloromethylisothiazolinone, or a mixture thereof. In one particular embodiment, the isothiazolinones may include a mixture of methylisothiazolinone and chloromethylisothiazolinone As indicated above, in one embodiment, the fungicide may include a pyrithione. The pyrithione may be any pyrithione as generally known in the art. For instance, the pyrithione may be a zinc pyrithione, a sodium pyrithione, a copper pyrithione, or a combination thereof. In one embodiment, the pyrithione may include at least a zinc pyrithione. In another embodiment, the pyrithione may include at least a sodium pyrithione. In a further embodiment, the pyrithione may include a zinc pyrithione and a sodium pyrithione.

The fungicides may be present in an antimicrobially effective amount, in particular a fungicidally effective amount or synergistic amount as defined in U.S. Pat. No. 8,138,196, which is incorporated herein by reference in its entirety.

In particular, the fungicides may be present in the coating in an amount of 1 ppm or more, such as 5 ppm or more, such as 10 ppm or more, such as 15 ppm or more, such as 20 ppm or more, such as 25 ppm or more, such as 30 ppm or more, such as 40 ppm or more, such as 50 ppm or more, such as 75 ppm or more, such as 100 ppm or more, such as 150 ppm or more, such as 200 ppm or more, such as 300 ppm or more, such as 400 ppm or more, such as 500 ppm or more. The fungicides may be present in the coating in an amount of 10,000 ppm or less, such as 5,000 ppm or less, such as 2,500 ppm or less, such as 2,000 ppm or less, such as 1,750 ppm or less, such as 1,500 ppm or less, such as 1,400 ppm or less, such as 1,300 ppm or less, such as 1,250 ppm or less, such as 1,200 ppm or less, such as 1,100 ppm or less, such as 1,000 ppm or less, such as 900 ppm or less, such as 800 ppm or less, such as 600 ppm or less, such as 500 ppm or less, such as 400 ppm or less, such as 300 ppm or less, such as 200 ppm or less, such as 150 ppm or less, such as 100 ppm or less, such as 75 ppm or less, such as 50 ppm or less, such as 40 ppm or less, such as 30 ppm or less. In addition, such ppm concentrations may also be based on the combined weight of the coating and facer. Further, such ppm concentrations may be based on the combined weight of the coating and facer per 1000 square feet. In addition, such ppm concentrations may apply to a single fungicide or a combination of fungicides.

Pigment

As indicated above, the coating and coating formulation also include additional components. For instance, the coating and coating formulation may also include a pigment, for example a white pigment. In general, a white pigment may be referred to as one that gives a white color. In one embodiment, the coating and coating formulation may include at least two pigments, a first pigment and a second pigment.

In one embodiment, the pigment includes a carbonate. For instance, the carbonate may include an alkaline earth metal. In this regard, the carbonate may include calcium carbonate, magnesium carbonate, or mixture thereof. In one particular embodiment, the carbonate includes at least calcium carbonate. In another embodiment, the carbonate includes calcium carbonate and magnesium carbonate.

In another embodiment, the pigment may also include titanium dioxide. The titanium dioxide may be in the rutile or anatase crystalline form. In one embodiment, the titanium dioxide may be in the rutile crystalline form. In another embodiment, the titanium dioxide may be in the anatase crystalline form.

The titanium dioxide pigment may be substantially pure titanium dioxide or may contain other metal oxides. For instance, the metal oxide may include, but is not limited to, silica, alumina, or zirconia. In one embodiment, the metal oxide includes at least two of silica, alumina, or zirconia. In one particular embodiment, the metal oxide includes at least silica. In another embodiment, the metal oxide includes at least alumina. In another particular embodiment, the metal oxide includes silica and alumina.

The titanium dioxide may be coated with the aforementioned metal oxide. The coating may be applied using various techniques known in the art, such as wet treatment techniques or oxidation with metal halides. In one embodiment, the titanium dioxide may first be coated with silica and then alumina.

In one embodiment, the pigment includes the aforementioned carbonate and a second pigment. For instance, the pigment may include a carbonate and a titanium dioxide. In particular, the pigment may include calcium carbonate and titanium dioxide. In a further embodiment, the pigment may include calcium carbonate, magnesium carbonate, and titanium dioxide.

The pigment may have a particular brightness as determined in accordance with T534 om-76. In particular, the brightness may be at least 70%, such as at least 75%, such as at least 80%, such as at least 85%, such as at least 90%, such as at least 95%. The brightness may be 100% or less, such as 98% or less, such as 97% or less.

The pigment may also have a particular median size. For instance, the median size may be 10 microns or less, such as 5 microns or less, such as 4 microns or less, such as 3 microns or less, such as 2 microns or less, such as 1 micron or less, such as 0.75 microns or less, such as 0.5 microns or less, such as 0.4 microns or less, such as 0.35 microns or less. The median size may be 0.05 microns or more, such as 0.1 microns or more, such as 0.15 microns or more, such as 0.2 microns or more, such as 0.25 microns or more, such as 0.3 microns or more.

The pigment may be present in an amount of 5 wt. % or more, such as 10 wt. % or more, such as 15 wt. % or more, such as 20 wt. % or more, such as 25 wt. % or more, such as 30 wt. % or more, such as 40 wt. % or more, such as 50 wt. % or more, such as 55 wt. % or more, such as 60 wt. % or more, such as 65 wt. % or more based on the weight of the coating formulation. The pigment may be present in an amount of less than 100 wt. %, such as 90 wt. % or less, such as 80 wt. % or less, such as 75 wt. % or less, such as 70 wt. % or less, such as 65 wt. % or less, such as 60 wt. % or less, such as 50 wt. % or less, such as 65 wt. % or less, such as 40 wt. % or less, such as 35 wt. % or less, such as 30 wt. % or less, such as 25 wt. % or less based on the weight of the coating formulation. Such weight percentages may apply to a single pigment or a combination of pigments.

The pigment may be present in an amount of 5 wt. % or more, such as 10 wt. % or more, such as 15 wt. % or more, such as 20 wt. % or more, such as 25 wt. % or more, such as 30 wt. % or more, such as 40 wt. % or more, such as 50 wt. % or more, such as 55 wt. % or more, such as 60 wt. % or more, such as 65 wt. % or more, such as 70 wt. % or more, such as 75 wt. % or more, such as 80 wt. % or more based on the solids content of the coating formulation. The pigment may be present in an amount of less than 100 wt. %, such as 90 wt. % or less, such as 85 wt. % or less, such as 80 wt. % or less, such as 75 wt. % or less, such as 70 wt. % or less, such as 65 wt. % or less, such as 60 wt. % or less, such as 50 wt. % or less, such as 45 wt. % or less, such as 40 wt. % or less, such as 35 wt. % or less, such as 30 wt. % or less, such as 25 wt. % or less based on the solids content of the coating formulation. Such weight percentages may also apply based on the weight of the dried coating. In addition, such weight percentages may apply to a single pigment or a combination of pigments.

Further, the aforementioned metal oxide may be present in an amount of 0.1 wt. % or more, such as 0.25 wt. % or more, such as 0.5 wt. % or more, such as 1 wt. % or more, such as 1.5 wt. % or more, such as 2 wt. % or more, such as 3 wt. % or more, such as 4 wt. % or more, such as 5 wt. % or more based on the weight of the titanium dioxide. The metal oxide may be present in an amount of 10 wt. % or less, such as 8 wt. % or less, such as 7 wt. % or less, such as 6 wt. % or less, such as 5 wt. % or less, such as 4.5 wt. % or less, such as 4 wt. % or less, such as 3.5 wt. % or less, such as 2 wt. % or less, such as 1.5 wt. % or less based on the weight of the titanium dioxide. Such weight percentages may apply to a single metal oxide or a combination of metal oxides.

In addition, the metal oxide may be present in an amount of 0.1 wt. % or more, such as 0.2 wt. % or more, such as 0.3 wt. % or more, such as 0.5 wt. % or more, such as 0.7 wt. % or more, such as 0.75 wt. % or more, such as 1 wt. % or more, such as 1.1 wt. % or more, such as 1.2 wt. % or more, such as 1.5 wt. % or more, such as 1.75 wt. % or more, such as 2 wt. % or more based on the weight of the coating formulation. The metal oxide may be present in an amount of 10 wt. % or less, such as 8 wt. % or less, such as 5 wt. % or less, such as 4 wt. % or less, such as 3 wt. % or less, such as 2.5 wt. % or less, such as 2.25 wt. % or less, such as 2 wt. % or less, such as 1.75 wt. % or less, such as 1.5 wt. % or less, such as 1.25 wt. % or less, such as 1 wt. % or less, such as 0.75 wt. % or less, such as 0.5 wt. % or less based on the weight of the coating formulation. Such weight percentages may apply to a single metal oxide or a combination of metal oxides.

In addition, the metal oxide may be present in an amount of 0.1 wt. % or more, such as 0.2 wt. % or more, such as 0.5 wt. % or more, such as 0.75 wt. % or more, such as 1 wt. % or more, such as 1.2 wt. % or more, such as 1.5 wt. % or more, such as 1.7 wt. % or more, such as 2 wt. % or more, such as 2.5 wt. % or more based on the solids content of the coating formulation. The metal oxide may be present in an amount of 10 wt. % or less, such as 8 wt. % or less, such as 5 wt. % or less, such as 4 wt. % or less, such as 3 wt. % or less, such as 2.5 wt. % or less, such as 2.25 wt. % or less, such as 2 wt. % or less, such as 1.75 wt. % or less, such as 1.5 wt. % or less, such as 1.2 5 wt. % or less, such as 1 wt. % or less, such as 0.75 wt. % or less, such as 0.5 wt. % or less based on the solids content of the coating formulation. Such weight percentages may also apply based on the weight of the dried coating. In addition, such weight percentages may apply to a single metal oxide or a combination of metal oxides.

Binder

As indicated above, the coating and coating formulation may also include additional components. For instance, the coating and coating formulation may also include a binder. For instance, in one embodiment, the binder may be a polymeric binder. The binder may be any binder as generally known in the art. The binder may include a vinyl acetate polymer or copolymer, an acrylic polymer or copolymer, a styrene polymer or copolymer, a vinyl acrylic polymer or copolymer, a cellulose, a starch, etc. or a mixture thereof.

In particular, the binder may include an acrylic (or acrylate) polymer or copolymer, a styrene acrylic copolymer, a styrene butadiene copolymer, a vinyl acrylic copolymer, or a mixture thereof. Suitable unsaturated monomers for use in forming the polymer are generally ethylenically unsaturated monomers and include vinylaromatic compounds (e.g. styrene, α-methylstyrene, o-chlorostyrene, and vinyltoluenes); 1,2-butadiene (i.e. butadiene); conjugated dienes (e.g. 1,3-butadiene and isoprene); α,β-monoethylenically unsaturated mono- and dicarboxylic acids or anhydrides thereof (e.g. acrylic acid, methacrylic acid, crotonic acid, dimethacrylic acid, ethylacrylic acid, allylacetic acid, vinylacetic acid maleic acid, fumaric acid, itaconic acid, mesaconic acid, methylenemalonic acid, citraconic acid, maleic anhydride, itaconic anhydride, and methylmalonic anhydride); esters of α,β-monoethylenically unsaturated mono- and dicarboxylic acids having 3 to 6 carbon atoms with alkanols having 1 to 12 carbon atoms (e.g. esters of acrylic acid, methacrylic acid, maleic acid, fumaric acid, or itaconic acid, with C1-C12, C1-C8, or C1-C4 alkanols such as ethyl, n-butyl, isobutyl and 2-ethylhexyl acrylates and methacrylates, dimethyl maleate and n-butyl maleate); acrylamides and alkyl-substituted acrylamides (e.g. (meth)acrylamide, N-tert-butylacrylamide, and N-methyl(meth)acrylamide); (meth) acrylonitrile; vinyl and vinylidene halides (e.g. vinyl chloride and vinylidene chloride); vinyl esters of C1-C18 mono- or dicarboxylic acids (e.g. vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g. hydroxyethyl(meth)acrylate, hydroxypropyl(meth) acrylate, and methylpolyglycol acrylate); and monomers containing glycidyl groups (e.g. glycidyl methacrylate).

Additional monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g. methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g. allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl(meth)acrylates or alkylaminoalkyl(meth)acrylamides or quaternization products thereof (e.g. 2-(N,N-dimethylamino)ethyl(meth)acrylate, 3-(N,N-dimethylamino)propyl(meth)acrylate, 2-(N,N,N-trimethylammonium)ethyl(meth)acrylate chloride, 2-dimethylaminoethyl(meth)acrylamide, 2-dimethylaminopropyl(meth)acrylamide, and 3-trimethylammoniumpropyl (meth)acrylamide chloride); allyl esters of C1-C30 monocarboxylic acids; N-Vinyl compounds (e.g. N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g. acetoacetoxyethyl(meth)acrylate or diacetonacrylamide; monomers containing urea groups (e.g. ureidoethyl(meth)acrylate, acrylamidoglycolic acid, and methacrylamidoglycolate methyl ether); and monomers containing silyl groups (e.g. trimethoxysilylpropyl methacrylate).

In one embodiment, the binder includes at least a styrene butadiene copolymer. In particular, the styrene butadiene copolymer may be a modified copolymer. For instance, the styrene butadiene copolymer may be a carboxylated styrene butadiene copolymer. In another embodiment, the binder includes at least an acrylic polymer. In particular, the binder may include a metal salt of an acrylic polymer, such as an alkali metal salt of an acrylic polymer. For instance, the alkali metal may include sodium. In a further embodiment, the binder includes both of the aforementioned styrene butadiene copolymer and acrylic polymer.

As indicated above, the binder may include a vinyl acetate polymer or copolymer. In this regard, the binder may include a polyvinyl acetate, an ethylene vinyl acetate, etc., or a mixture thereof.

As indicated above, the binder may include a cellulose, such as a cellulose ether. The cellulose ether may include a hydroxyethyl cellulose, a carboxymethyl cellulose, a hydroxypropyl cellulose, etc., or a mixture thereof.

The binder may be present in an amount of 0.1 wt. % or more, such as 0.2 wt. % or more, such as 0.3 wt. % or more, such as 0.5 wt. % or more, such as 0.8 wt. % or more, such as 1 wt. % or more, such as 2 wt. % or more, such as 3 wt.

% or more, such as 5 wt. % or more, such as 7 wt. % or more, such as 8 wt. % or more, such as 10 wt. % or more, such as 15 wt. % or more, such as 20 wt. % or more based on the weight of the coating formulation. The binder may be present in an amount of less than 100 wt. %, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 15 wt. % or less, such as 10 wt. % or less, such as 9 wt. % or less, such as 8 wt. % or less, such as 5 wt. % or less, such as 3 wt. % or less, such as 2 wt. % or less, such as 1 wt. % or less, such as 0.9 wt. % or less, such as 0.7 wt. % or less, such as 0.5 wt. % or less based on the weight of the coating formulation. Such weight percentages may apply to a single binder or a combination of binders.

The binder may be present in an amount of 0.1 wt. % or more, such as 0.2 wt. % or more, such as 0.3 wt. % or more, such as 0.5 wt. % or more, such as 0.8 wt. % or more, such as 1 wt. % or more, such as 2 wt. % or more, such as 3 wt. % or more, such as 5 wt. % or more, such as 7 wt. % or more, such as 8 wt. % or more, such as 10 wt. % or more, such as 15 wt. % or more, such as 20 wt. % or more based on the solids content of the coating formulation. The binder may be present in an amount of less than 100 wt. %, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 15 wt. % or less, such as 10 wt. % or less, such as 9 wt. % or less, such as 8 wt. % or less, such as 5 wt. % or less, such as 3 wt. % or less, such as 2 wt. % or less, such as 1 wt. % or less, such as 0.9 wt. % or less, such as 0.7 wt. % or less, such as 0.5 wt. % or less based on the solids content of the coating formulation. Such weight percentages may also apply based on the weight of the dried coating. In addition, such weight percentages may apply to a single binder or a combination of binders.

Wax

As indicated above, the coating and coating formulation may also include additional components. For instance, the coating and coating formulation may also include a wax. The wax may be any wax as generally known in the art. In general, the wax may be a solid at room temperature but may melt or soften when heated, such as at a temperature of 25° C. or more, such as 30° C. or more, such as 40° C. or more, such as 50° C. or more, such as 75° C. or more, such as 100° C. or more, such as 125° C. or more. Such temperature may also be referred to as the softening point of the wax.

The wax may be a natural wax, a synthetic wax or a combination thereof. The waxy may include animal waxes (e.g., beeswax, shlac wax, wool wax), vegetable waxes (e.g., bayberry wax, carnauba wax, castor wax, Jojoba oil wax, rice bran wax, soy wax), mineral waxes (e.g., montan wax, peat wax), petroleum waxes (e.g., paraffin wax, microcrystalline wax), synthetic waxes (e.g., polyolefin wax, polytetrafluoroethylene wax, stearamide wax, polymerized α-olefin wax, substituted amide waxes). The waxes may include any combination of the aforementioned waxes.

In one embodiment, the wax includes a polyolefin wax. The polyolefin wax may be a homopolymer wax or a copolymer wax. The polyolefin wax may be a modified wax or an unmodified wax. The polyolefin wax may be a polyethylene wax, a polypropylene wax, or a mixture thereof. In one embodiment, the wax includes at least a polyethylene wax, such as a homopolymer polyethylene wax, a copolymer polyethylene wax, or a mixture thereof. In another embodiment, the wax includes a polypropylene wax, such as a homopolymer polypropylene wax, a copolymer polypropylene wax, or a mixture thereof.

In general, the wax may be branched or linear. Also, the way may have low crystallinity (e.g., less than 20%), moderate crystallinity (e.g., 20% to 40%), or high crystallinity (e.g., greater than 40%). The wax may have a weight average molecular weight of 500 g/mol or more, such as 1,000 g/mol or more, such as 1,500 g/mol or more, such as 2,000 g/mol or more, such as 3,000 g/mol or more, such as 4,000 g/mol or more, such as 5,000 g/mol or more. The way may have a weight average molecular weight of 50,000 g/mol or less, such as 40,000 g/mol or less, such as 30,000 g/mol or less, such as 20,000 g/mol or less, such as 15,000 g/mol or less, such as 13,000 g/mol or less, such as 11,000 g/mol or less, such as 10,000 g/mol or less, such as 8,000 g/mol or less. The wax may have a polydispersity of from about 1.0 to about 4.0, more preferably from about 1.0 to about 2.5 and most preferably from about 1.0 to about 1.5.

In addition, the wax may generally not form a stand-alone film. Furthermore, the wax may have a certain viscosity at 25° C. when dispersed in water. For instance, the viscosity may be 5 cps or more, such as 10 cps or more, such as 25 cps or more, such as 30 cps or more, such as 40 cps or more, such as 50 cps or more, such as 100 cps or more, such as 250 cps or more, such as 300 cps or more, such as 500 cps or more, such as 1,000 cps or more. The viscosity may be 10,000 cps or less, such as 7,500 cps or less, such as 5,000 cps or less, such as 2,500 cps or less, such as 2,000 cps or less, such as 1,500 cps or less, such as 1,000 cps or less, such as 750 cps or less, such as 500 cps or less, such as 400 cps or less, such as 300 cps or less, such as 200 cps or less, such as 150 cps or less, such as 100 cps or less, such as 75 cps or less, such as 50 cps or less, such as 40 cps or less. Such viscosity may be measured using known techniques in the art. For instance, the viscosity may be measured using a Brookfield instrument or test, such as a Brookfield rotational viscometer.

The wax may also have a certain average particle size. For instance, the wax may have particles having an average particle size of 0.1 microns or more, such as 0.25 microns or more, such as 0.5 microns or more, such as 0.75 microns or more, such as 1 micron or more, such as 2 microns or more, such as 3 microns or more, such as 3.5 microns or more, such as 4 microns or more. The wax may have particles having an average particle size of 20 microns or less, such as 15 microns or less, such as 10 microns or less, such as 8 microns or less, such as 7 microns or less, such as 6 microns or less, such as 5 microns or less, such as 4.5 microns or less. Furthermore, all of the wax particles may have a particle size of 30 microns or less, such as 25 microns or less, such as 20 microns or less.

The wax may be present in the coating formulation in an amount of 0.001 wt. % or more, such as 0.01 wt. % or more, such as 0.02 wt. % or more, such as 0.04 wt. % or more, such as 0.05 wt. % or more, such as 0.06 wt. % or more, such as 0.07 wt. % or more, such as 0.08 wt. % or more, such as 0.01 wt. % or more. The wax may be present in the coating formulation in an amount of 5 wt. % or less, such as 4 wt. % or less, such as 3 wt. % or less, such as 2 wt. % or less, such as 1.5 wt. % or less, such as 1 wt. % or less, such as 0.75 wt. % or less, such as 0.5 wt. % or less, such as 0.4 wt. % or less, such as 0.3 wt. % or less, such as 0.2 wt. % or less, such as 0.15 wt. % or less, such as 0.1 wt. % or less. Such weight percentages may apply to a single wax or a combination of waxes.

The wax may be present in the coating formulation in an amount of 0.001 wt. % or more, such as 0.01 wt. % or more, such as 0.02 wt. % or more, such as 0.04 wt. % or more, such as 0.05 wt. % or more, such as 0.06 wt. % or more, such as 0.07 wt. % or more, such as 0.08 wt. % or more, such as 0.01 wt. % or more based on the solids content of the coating formulation. The wax may be present in the coating formulation in an amount of 5 wt. % or less, such as 4 wt. % or less, such as 3 wt. % or less, such as 2 wt. % or less, such as 1.5 wt. % or less, such as 1 wt. % or less, such as 0.75 wt. % or less, such as 0.5 wt. % or less, such as 0.3 wt. % or less, such as 0.3 wt. % or less, such as 0.2 wt. % or less, such as 0.15 wt. % or less, such as 0.1 wt. % or less based on the solids content of the coating formulation. Such weight percentages may also apply based on the weight of the dried coating. In addition, such weight percentages may apply to a single wax or a combination of waxes.

Wetting Agent

As indicated above, the coating and coating formulation may also include additional components. For instance, the coating and coating formulation may also include a wetting agent. The wetting agent may be a surfactant. The surfactant may be an anionic surfactant, a cationic surfactant, a non-ionic surfactant, or any mixtures thereof. In one particular embodiment, the surfactant may be an anionic surfactant. In another particular embodiment, the surfactant may be a nonionic surfactant. In a further embodiment, the surfactant may be a cationic surfactant.

As indicated above, in one embodiment, the surfactant may include an anionic surfactant. In general, anionic surfactants include those having one or more negatively charged functional groups. For instance, the anionic surfactant includes alkali metal or ammonium salts of alkyl, aryl or alkylaryl sulfonates, sulfates, phosphates. For instance, the anionic surfactant may include sodium lauryl sulfate, sodium octylphenol glycolether sulfate, sodium dodecylbenzene sulfonate, sodium lauryldiglycol sulfate, ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and mixtures thereof. Other examples include a $C_8$-$C_{22}$ alkyl fatty acid salt of an alkali metal, alkaline earth metal, ammonium, alkyl substituted ammonium, for example, isopropylamine salt, or alkanolammonium salt, a $C_8$-$C_{22}$ alkyl fatty acid ester, a $C_8$-$C_{22}$ alkyl fatty acid ester salt, and alkyl ether carboxylates.

In one particular embodiment, the anionic surfactant includes a water-soluble salt, particularly an alkali metal salt, of an organic sulfur reaction product having in their molecular structure an alkyl radical containing from about 8 to 22 carbon atoms and a radical selected from the group consisting of sulfonic and sulfuric acid ester radicals. Organic sulfur based anionic surfactants include the salts of $C_{10}$-$C_{16}$ alkylbenzene sulfonates, $C_{10}$-$C_{22}$ alkane sulfonates, $C_{10}$-$C_{22}$ alkyl ether sulfates, $C_{10}$-$C_{22}$ alkyl sulfates, $C_4$-$C_{10}$ dialkylsulfosuccinates, $C_{10}$-$C_{22}$ acyl isothionates, alkyl diphenyloxide sulfonates, alkyl naphthalene sulfonates, and 2-acetamido hexadecane sulfonates. Organic phosphate based anionic surfactants include organic phosphate esters such as complex mono- or diester phosphates of hydroxyl-terminated alkoxide condensates, or salts thereof. Included in the organic phosphate esters are phosphate ester derivatives of polyoxyalkylated alkylaryl phosphate esters, of ethoxylated linear alcohols and ethoxylates of phenol. Particular examples of anionic surfactants include a polyoxyethylene alkyl ether sulfuric ester salt, a polyoxyethylene alkylphenyl ether sulfuric ester salt, polyoxyethylene styrenated alkylether ammonium sulfate, polyoxymethylene alkylphenyl ether ammonium sulfate, and the like, and mixtures thereof. For instance, the anionic surfactant may include a polyoxyethylene alkyl ether sulfuric ester salt, a polyoxyethylene alkylphenyl ether sulfuric ester salt, or a mixture thereof.

As indicated above, in one embodiment, the surfactant may include a non-ionic surfactant. The non-ionic surfactant may be generally as known in the art. Generally, nonionic surfactants include, but are not limited to, amine oxides, fatty acid amides, ethoxylates (e.g., ethoxylated fatty acids, ethoxylated fatty alcohols, etc.), block copolymers of polyethylene glycol and polypropylene glycol, glycerol alkyl esters, alkyl polyglucosides, polyoxyethylene glycol octylphenol ethers, sorbitan alkyl esters, polyoxyethylene glycol sorbitan alkyl esters, and mixtures thereof. For instance, the non-ionic surfactant may include a polyethylene oxide condensate of an alkyl phenol (e.g., the condensation product of an alkyl phenol having an alkyl group containing from 6 to 12 carbon atoms in either a straight chain or branched chain configuration, with ethylene oxide (e.g., present in amounts equal to 1 to 40 moles)). The alkyl substituent may be derived, for example, from polymerized propylene, di-isobutylene, octane or nonene. Other examples include dodecylphenol condensed with 12 moles of ethylene oxide per mole of phenol; dinonylphenol condensed with 5 moles of ethylene oxide per mole of phenol; nonylphenol condensed with 9 moles of ethylene oxide per mole of nonylphenol and di-iso-octylphenol condensed with 5 moles of ethylene oxide. The non-ionic surfactant may be a condensation product of a primary or secondary aliphatic alcohol having from 8 to 24 carbon atoms, in either straight chain or branched chain configuration, with from 1 to about 40 moles of alkylene oxide per mole of alcohol. The non-ionic surfactant may include a compound formed by condensing ethylene oxide with a hydrophobic base formed by the condensation of propylene oxide with propylene glycol (e.g., Pluronics).

As indicated above, in one embodiment, the surfactant may include a cationic surfactant. Examples of the cationic surfactant may include water-soluble quaternary ammonium compounds, polyammonium salts, a polyoxyethylene alkylamine and the like.

Such wetting agent may be present in the coating formulation in an amount of 0.01 wt. % or more, such as 0.01 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 0.75 wt. % or more, such as 1 wt. % or more. The wetting agent may be present in the coating formulation in an amount of 5 wt. % or less, such as 4 wt. % or less, such as 3 wt. % or less, such as 2 wt. % or less, such as 1.5 wt. % or less, such as 1 wt. % or less, such as 0.75 wt. % or less, such as 0.5 wt. % or less, such as 0.4 wt. % or less, such as 0.35 wt. % or less, such as 0.3 wt. % or less, such as 0.25 wt. % or less, such as 0.2 wt. % or less, such as 0.15 wt. % or less. Such weight percentages may apply to a single wetting agent or a combination of wetting agents.

Such wetting agent may be present in the coating formulation in an amount of 0.01 wt. % or more, such as 0.01 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 0.75 wt. % or more, such as 1 wt. % or more based on the solids content of the coating formulations. The wetting agent may be present in the coating formulation in an amount of 5 wt. % or less, such as 4 wt. % or less, such as 3 wt. % or less, such as 2 wt. % or less, such as 1.5 wt. % or less, such as 1 wt. % or less, such as 0.75 wt. % or less, such as 0.5 wt. % or less, such as 0.4 wt. % or less, such as 0.35 wt. % or less, such as 0.3 wt. % or less, such as 0.25 wt. % or less, such as 0.2 wt. % or less, such as 0.15 wt. % or less based on the solids content of the coating formulations. Such weight percentages may also apply based on the weight of the dried coating. In addition, such weight percentages may apply to a single wetting agent or a combination of wetting agents.

Additional Components

The coating and coating formulation may also include additional components as generally known in the art. For instance, the coating and/or coating formulation may include aggregates (e.g., silica, sand, mica, talc), preservatives, pH adjusters, moisture resistant additives (e.g., silicone), etc.

Such additional components may be present in the coating formulation in an amount of 0 wt. % or more, such as 0.01 wt. % or more, such as 0.05 wt. % or more, such as 0.1 wt. % or more, such as 0.25 wt. % or more, such as 0.5 wt. % or more, such as 0.75 wt. % or more, such as 1 wt. % or more, such as 1.25 wt. % or more, such as 1.5 wt. % or more, such as 2 wt. % or more. The additional components may be present in the coating formulation in an amount of 10 wt. % or less, such as 8 wt. % or less, such as 6 wt. % or less, such as 5 wt. % or less, such as 4 wt. % or less, such as 3 wt. % or less, such as 2 wt. % or less, such as 1.5 wt. % or less, such as 1 wt. % or less, such as 0.75 wt. % or less, such as 0.5 wt. % or less, such as 0.25 wt. % or less, such as 0.2 wt. % or less, such as 0.15 wt. % or less, such as 0.1 wt. % or less. Such weight percentages may apply to a single additional component or a combination of additional components.

Such additional components may be present in the coating formulation in an amount of 0 wt. % or more, such as 0.01 wt. % or more, such as 0.05 wt. % or more, such as 0.1 wt. % or more, such as 0.25 wt. % or more, such as 0.5 wt. % or more, such as 0.75 wt. % or more, such as 1 wt. % or more, such as 1.25 wt. % or more, such as 1.5 wt. % or more, such as 2 wt. % or more based on weight solids content of the coating formulation. The additional components may be present in the coating formulation in an amount of 10 wt. % or less, such as 8 wt. % or less, such as 6 wt. % or less, such as 5 wt. % or less, such as 4 wt. % or less, such as 3 wt. % or less, such as 2 wt. % or less, such as 1.5 wt. % or less, such as 1 wt. % or less, such as 0.75 wt. % or less, such as 0.5 wt. % or less, such as 0.25 wt. % or less, such as 0.2 wt. % or less, such as 0.15 wt. % or less, such as 0.1 wt. % or less based on weight solids content of the coating formulation. Such weight percentages may also apply based on the weight of the dried coating. In addition, such weight percentages may apply to a single additional component or a combination of additional components.

Coating Formulation

The present invention is also directed to a coating formulation. The coating formulation includes the aforementioned components. For instance, the coating formulation includes at least one fungicide and at least one pigment. The coating formulation may also include at least one binder. The coating formulation may also include at least one wax. The coating formulation may also include at least one wetting agent, such as a surfactant. However, the coating formulation may also include other additives as generally known in the art.

For instance, in one embodiment, the coating formulation may also include a carrier, in particular a liquid carrier. The carrier may assist in delivering the components of the coating formulation to a substrate. The liquid carrier may be any liquid carrier as generally known in the art. In one embodiment, the liquid carrier may be water.

The liquid carrier may be present in the coating formulation in an amount of 2 wt. % or more, such as 5 wt. % or more, such as 10 wt. % or more, such as 15 wt. % or more, such as such as 20 wt. % or more, such as 25 wt. % or more, such as 30 wt. % or more, such as 40 wt. % or more, such as 50 wt. % or more, such as 60 wt. % or more, such as 70 wt. % or more, such as 80 wt. % or more. The liquid carrier may be present in the coating formulation in an amount of less than 100 wt. %, such as 90 wt. % or less, such as 80 wt. % or less, such as 70 wt. % or less, such as 60 wt. % or less, such as 50 wt. % or less, such as 40 wt. % or less, such as 30 wt. % or less.

The solids content of the coating formulation may be 5 wt. % or more, such as 10 wt. % or more, such as 20 wt. % or more, such as 30 wt. % or more, such as 40 wt. % or more, such as 50 wt. % or more, such as 60 wt. % or more, such as 70 wt. % or more, such as 75 wt. % or more. The solids content of the coating formulation may be less than 100 wt. %, such as 90 wt. % or less, such as 80 wt. % or less, such as 75 wt. % or less, such as 60 wt. % or less, such as 50 wt. % or less, such as 40 wt. % or less.

In one embodiment, the coating formulation may be an alkaline pH. For instance, the coating formulation may have a pH of greater than 7, such as 7.5 or more, such as 8 or more, such as 8.5 or more, such as 9 or more. The pH may be less than 14, such as 13 or less, such as 12 or less, such as 10 or less, such as 9.5 or less, such as 9 or less.

Coating

As indicated herein, the coating is provided for a building panel, such as a gypsum board or a cement board. In one embodiment, the building panel comprises a gypsum board. In another embodiment, the building panel comprises a cement board.

In general, the building panel includes a cementitious core having a first side and a second side opposing the first side. The cementitious core may be a gypsum core or a cement core. The building panel also includes a facing material on both sides, such as the major (or broad) surfaces (i.e., front surface and back surface or otherwise known as front facing material and back facing material, respectively). In general, the composition of the cementitious core is not limited by the present invention and may include any components as generally known in the art.

In particular, the gypsum board includes a gypsum core having a first side and a second side opposing the first side. The gypsum board also includes a facing material on both sides, such as the major (or broad) surfaces (i.e., front surface and back surface or otherwise known as front facing material and back facing material, respectively). In general, the back facing material is on the surface of the gypsum core that faces the interior of a wall assembly and the front facing material is on the opposite surface. In addition, the composition of the gypsum core is not limited by the present invention and may include any components as generally known in the art.

Similarly, the cement board includes a cement core having a first side and a second side opposing the first side. The cement board also includes a facing material on both sides, such as the major (or broad) surfaces (i.e., front surface and back surface or otherwise known as front facing material and back facing material, respectively). In general, the composition of the cement core is not limited by the present invention and may include any components as generally known in the art.

Furthermore, the facing material is not limited by the present invention. For instance, the facing material may be paper, glass mat, or glass mesh. In one embodiment, both facing materials are paper. In another embodiment, both facing materials are glass mat. In a further embodiment, both facing materials are glass mesh. In a further embodiment, one facing material is paper while the other facing material is glass, such as glass mat.

In one embodiment, the coating disclosed herein is provided on the front facing material. In another embodiment, the coating is provided on the back facing material. In a further embodiment, the coating is provided on a front facing material and a back facing material.

The coating can be applied using various methods known in the art. For instance, the coating can be applied by using techniques including, but not limited to, spraying, rolling, or coating the coating formulation onto the facing material. However, it should be understood that other methods as generally employed in the art may also be utilized.

The coating may be present on the facing material in an amount of at least 1 pound/1000 square feet, such as at least 2 pounds/1000 square feet, such as at least 3 pounds/1000 square feet, such as at least 4 pounds/1000 square feet, such as at least 5 pounds/1000 square feet, such as at least 6 pounds/1000 square feet. The coating may be present on the facer in an amount of 15 pounds per 1000 square feet or less, such as 10 pounds per 1000 square feet or less, such as 9 pounds per 1000 square feet or less, such as 8 pounds per 1000 square feet or less, such as 7 pounds per 1000 square feet or less, such as 6 pounds per 1000 square feet or less.

In this regard, the coating formulation may be applied to the facing material prior to forming the panel, such as the gypsum board. For instance, the facing material may be pre-coated. Alternatively, the coating formulation may be applied to the facing material in-line during production of the panel, such as the gypsum board. For instance, the coating formulation may be applied to the facing material prior to deposition of the slurry, such as the gypsum slurry, such that the coating formulation has sufficient time to dry. Alternatively, the coating formulation may be applied after deposition of the slurry, such as the gypsum slurry.

In this regard, the present invention is also directed to a method of forming a coated facing material. The method comprises applying the coating formulation as disclosed herein to a facing material. The method may also include a step of drying the facing material to form the coating. Such drying may be in the presence of air. Additionally, the drying temperature may be 25° C. or more, such as 30° C. or more, such as 35° C. or more, such as 40° C. or more, such as 50° C. or more.

Furthermore, the present invention is also directed to a method of forming a building panel, such as a gypsum board or a cement board. The method comprises a step of providing a first facing material, depositing a slurry, such as a gypsum slurry nor a cement slurry, onto the first facing material, and providing a second facing material on top of the slurry. In this regard, such method may form a "sandwich." Furthermore, at least one of the first facing material or second facing material includes the coating as disclosed herein. The coating may be provided on the surface of the facing material that is opposite the surface adjacent to the slurry or core. Thereafter, the slurry and core may set, the board may be dried, and the board may be cut or sliced using standard techniques as known in the art.

In the aforementioned, the coating may be provided to the facing material prior to the providing steps as disclosed above. In this regard, the facing material may be pre-coated. That is, the facing material may be pre-coated off-line (i.e., in a different manufacturing line) and dried. The facing material may then be optionally rolled and placed in-line for the providing step mentioned above. Alternatively, the facing material may be provided in-line and coated in-line prior to the providing step mentioned above.

In another embodiment, the coating may be provided to the facing material after the providing step as disclosed above. For instance, once the facing material is provided to the manufacturing process and the slurry, such as the gypsum slurry, is sandwiched, the coating formulation may be applied as disclosed herein in order to provide the coating on the facing material.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A gypsum board comprising:
a gypsum core having a first side and a second side opposing the first side,
at least one facing material having a coating comprising at least one fungicide comprising at least one of an azole, a strobilurin, a fludioxonil, an isothiazolinone, a pyrithione, or a mixture thereof, at least one polymeric binder, and at least one pigment,
wherein the board exhibits at least a Level 3 finish, and
wherein the board satisfies at least one of the following:
the board exhibits a rating of 2 or less when tested in accordance to ASTM G21-15, or
the board exhibits a rating of at least 8 when tested in accordance to ASTM D3273-16.

2. The gypsum board of claim 1, wherein the board exhibits a rating of 2 or less when tested in accordance to ASTM G21-15 and a rating of at least 8 when tested in accordance to ASTM D3273-16.

3. The gypsum board of claim 1, wherein the board exhibits a Level 5 finish.

4. The gypsum board of claim 1, wherein the board exhibits an abrasion rating of at least 2 when tested in accordance to ASTM C1629/C1629M-15.

5. The gypsum board of claim 1, wherein the at least one fungicide includes an azole, a strobilurin, a fludioxonil, or a mixture thereof.

6. The gypsum board of claim 1, wherein the coating includes at least three fungicides.

7. The gypsum board of claim 6, wherein the at least three fungicides include a mixture of thiabendazole, azoxystrobin, and fludioxonil.

8. The gypsum board of claim 1, wherein the fungicides are present in the coating in an amount of from 1 ppm to 10,000 ppm.

9. The gypsum board of claim 1, wherein the pigment comprises a white pigment.

10. The gypsum board of claim 9, wherein the pigment comprises calcium carbonate, magnesium carbonate, or a mixture thereof.

11. The gypsum board of claim 10, wherein the pigment further comprises a titanium dioxide.

12. The gypsum board of claim 1, wherein the pigment has a brightness of at least 90% as determined in accordance to T534 om-76 and/or a median size of from 0.1 microns to 5 microns.

13. The gypsum board of claim 1, wherein the polymeric binder comprises a vinyl acetate polymer or copolymer, an acrylic polymer or copolymer, a styrene polymer or copolymer, a vinyl acrylic polymer or copolymer, a cellulose, a starch, or a mixture thereof.

14. The gypsum board of claim 1, wherein the polymeric binder comprises an acrylic polymer or copolymer, a styrene acrylic copolymer, a styrene butadiene copolymer, a vinyl acrylic copolymer, or a mixture thereof.

15. The gypsum board of claim 1, wherein the polymeric binder comprises a mixture of an acrylic polymer or copolymer, a styrene butadiene copolymer, and a cellulose.

16. The gypsum board of claim 1, wherein the coating comprises a surfactant.

17. The gypsum board of claim 1, wherein the coating comprises a wax.

18. The gypsum board of claim 17, wherein the wax comprises a polyolefin wax.

19. The gypsum board of claim 1, wherein the facing material comprises a paper.

20. The gypsum board of claim 1, wherein the facing material comprises a glass mat.

21. A method of making the gypsum board of claim 1, the method comprising:
providing a first facing material,
depositing a gypsum slurry onto the first facing material,
providing a second facing material onto the gypsum slurry, and
wherein at least one of the first facing material and the second facing material includes a coating comprising at least one fungicide, at least one polymeric binder, and at least one pigment.

22. The method of claim 21, wherein the coating is applied to the first facing material prior to depositing the gypsum slurry.

23. The method of claim 21, wherein the coating is applied to the second facing material prior to providing on top of the gypsum slurry.

24. A building panel comprising:
a cementitious core having a first side and a second side opposing the first side,
at least one facing material having a coating comprising at least one fungicide comprising an azole, a strobilurin, a fludioxonil, or a mixture thereof, at least one polymeric binder, and at least one pigment, and
wherein the panel satisfies at least one of the following:
the panel exhibits a rating of 2 or less when tested in accordance to ASTM G21-15, or
the panel exhibits a rating of at least 8 when tested in accordance to ASTM D3273-16.

25. A gypsum board comprising:
a gypsum core having a first side and a second side opposing the first side,
at least one facing material having a coating comprising at least one fungicide, at least one polymeric binder comprising an acrylic polymer or copolymer, a styrene acrylic copolymer, a styrene butadiene copolymer, a vinyl acrylic copolymer, or a mixture thereof, and at least one pigment,
wherein the board exhibits at least a Level 3 finish, and
wherein the board satisfies at least one of the following:
the board exhibits a rating of 2 or less when tested in accordance to ASTM G21-15, or
the board exhibits a rating of at least 8 when tested in accordance to ASTM D3273-16.

26. The gypsum board of claim 25, wherein the polymeric binder comprises a mixture of an acrylic polymer or copolymer and a styrene butadiene copolymer and further comprises a cellulose.

* * * * *